United States Patent
Hong et al.

[11] Patent Number: 6,150,822
[45] Date of Patent: *Nov. 21, 2000

[54] SENSOR IN BIT FOR MEASURING FORMATION PROPERTIES WHILE DRILLING

[75] Inventors: Harry T. Hong, Plano; Keith W. Katahara, Allen, both of Tex.

[73] Assignee: Atlantic Richfield Company, Chicago, Ill.

[*] Notice: This patent is subject to a terminal disclaimer.

[21] Appl. No.: 08/448,134

[22] Filed: Jul. 17, 1995

Related U.S. Application Data

[63] Continuation of application No. 08/184,795, Jan. 21, 1994, Pat. No. 5,475,309.

[51] Int. Cl.[7] .................................. G01V 3/30; G01V 5/04
[52] U.S. Cl. ............................................................. 324/338
[58] Field of Search ....................... 324/338–341, 324/345, 346, 323, 356, 359, 355, 366, 369; 73/151, 152; 175/40; 250/254; 181/102; 367/25, 35

[56] References Cited

U.S. PATENT DOCUMENTS

| | | | |
|---|---|---|---|
| 2,310,611 | 2/1943 | Blondeau | 324/369 |
| 2,354,887 | 8/1944 | Silverman et al. | 324/369 |
| 2,917,704 | 12/1959 | Arps | 324/356 |
| 3,293,542 | 12/1966 | Piety | 324/369 |
| 3,412,321 | 11/1968 | Unterberger et al. | 324/369 |
| 4,893,084 | 1/1990 | Rau | 324/341 |
| 4,940,943 | 7/1990 | Bartel et al. | 324/338 |

*Primary Examiner*—Walter E. Snow
*Attorney, Agent, or Firm*—James A. Gabala

[57] ABSTRACT

Earth formation evaluation for detection of hydrocarbon fluids is carried out by a microwave frequency range sensor (antenna or wave guide) disposed in the face of a diamond or PDC drill bit configured to minimize invasion of drilling fluid into the formation ahead of the bit. The sensor is connected to an instrument disposed in a sub interposed in the drill stem for generating and measuring the alteration of microwave energy. In particular, the dielectric constant of the earth formation in a zone which is substantially uninvaded by drilling fluid may be detected and compared with density and/or porosity logs to determine the presence of hydrocarbons in relatively thin layers of formation material.

6 Claims, 1 Drawing Sheet

SENSOR IN BIT FOR MEASURING FORMATION PROPERTIES WHILE DRILLING

This is a continuation of application Ser. No. 08/184,795 filed on Jan. 21, 1994, now U.S. Pat. No. 5,475,309.

BACKGROUND OF THE INVENTION

1. Field of the Invention

The present invention pertains to an improved method of measuring earth formation properties using a sensor disposed in a drill bit which detects electromagnetic radiation in the microwave frequency range so that the water content of the formation may be compared with the formation porosity to estimate the presence of hydrocarbon fluids in the formation.

2. Background

The continued development of so called wire line logging methods and the measurement of earth formation properties while drilling, sometimes referred to as measuring-while-drilling (MWD) and formation-evaluation-while-drilling (FEWD), has resulted in more useful data regarding earth formation properties than was previously available. The tools for performing these measurements are usually located in pipe sections or "subs" interposed in a drill string several feet above the drill bit. One of the advantages of making measurements with instruments which are disposed in the drill string near the bit is the decreased influence of the invasion of the formation by the drilling fluid or other fluids in the wellbore. In many formations, however, even the formation evaluation measurements taken only a few feet above the drill bit are subject to errors due to the effects of drilling fluid invasion into the formation material.

Another problem associated with present formation measurement-while-drilling technology is the inability of existing instruments to accurately measure formation properties of relatively thin layers or beds of earth material. Moreover, known types of instruments that do have relatively high vertical or wellbore longitudinal resolution also cannot investigate formation properties beyond relatively shallow depths in the formation material and hence these instruments see only the portion of the formation which has been invaded by wellbore fluids.

Accordingly, there has been a continuing and long felt need to develop a sensing device or system wherein relatively thin layers of earth formation may be measured with respect to certain properties and wherein the measurements taken are not subject to errors due to invasion of the formation material by wellbore fluids.

SUMMARY OF THE INVENTION

The present invention provides a unique arrangement of a sensor disposed on a rock drilling bit in such a way that the sensor is operable to make measurements of formation properties without being subject to measurement errors resulting from invasion of the earth formation material by wellbore fluids. The present invention also provides an improved device and method for detecting the presence of certain materials in an earth formation, such as hydrocarbon fluids in relatively thin layers of formation material, which might go undetected by conventional measuring techniques.

In accordance with an important aspect of the present invention an improved arrangement of a formation property measuring sensor is provided wherein the sensor is located in a substantially transverse face of a drill bit, particularly a bit of the type commonly known as polycrystalline diamond compact (PDC) bits, also known as synthetic or natural diamond bits. Moreover, the bit and sensor are arranged such that the accumulation of drilling fluid filtrate in the formation directly ahead of the bit is minimized.

In accordance with another aspect of the present invention there is provided an improved method of measuring formation properties using a sensor disposed in the face of a rock drilling bit which radiates electromagnetic wave energy in the microwave frequency range whereby resolution of a reflected microwave signal from the formation ahead of the bit is such as to accurately measure the dielectric properties of the formation which may be related to the fluid, particularly water, content of the formation.

In accordance with another important aspect of the present invention a method of evaluating formation properties is provided wherein the dielectric properties of the formation are compared with density and porosity measurements which may also be made while drilling the formation. In particular, the formation porosity measurements may be compared with the measurements taken by a microwave energy emitter and sensor system to detect the presence of hydrocarbon fluids, particularly in relatively thin layers or beds of formation material.

The use of microwave frequency range electromagnetic energy as the measurement medium is advantageous in that relatively thin layers of earth material may be evaluated because of the high spatial resolution capability of the microwave measurements. The measurements are sensitive to the nature of fluids in the formation pore spaces wherein high signal values are obtainable for formations in which water is present.

Still further, the invention contemplates that a sensor disposed in a rock bit of the type described above may emit and sense nuclear, low frequency electromagnetic wave energy or acoustic energy.

Those skilled in the art will recognize the above described advantages and features of the invention together with other important aspects thereof upon reading the detailed description which follows in conjunction with the drawing.

DETAILED DESCRIPTION OF PREFERRED EMBODIMENTS

Figure 1:
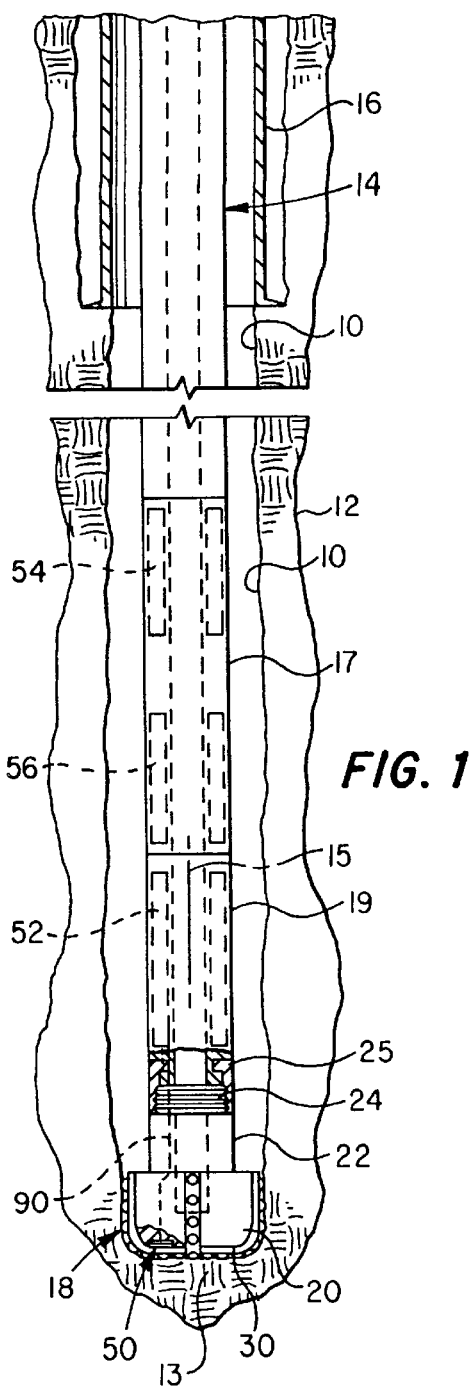
FIG. 1 is a view, in somewhat schematic form, of a well being drilled with the improved sensor arrangement and method of the present invention.

In the description which follows like parts are marked throughout the specification and drawing with the same reference numerals, respectively. The drawing figures are not necessarily to scale in the interest of clarity and conciseness.

Referring to FIG. 1, there is shown a portion of a wellbore 10 being formed in an earth formation 12 which may have several relatively thin vertically spaced layers or beds, not shown, which are desired to be measured to determine if hydrocarbon fluids are present in commercial quantities. The wellbore 10 is shown being formed by a rotatable drill stem 14 extending through a cased portion of the wellbore 10 defined by a conventional casing 16. The drill stem 14 includes two instrument carrying sections or subs, 17 and 19 connected thereto and a distal end characterized by a drill bit 18 which, preferably, is of the so called diamond type or PDC type, aforementioned. This type of bit is characterized by a generally cylindrical body 20, see FIGS. 2 and 3 also, having a reduced diameter portion 22 and a threaded pin portion 24, FIG. 1, which may be releasably connected to the sub 19 by a special modified internally threaded box part 25 of the sub 19 to permit connection of the bit to the sub 19 without rotation of the bit relative to the sub.

Figure 2:
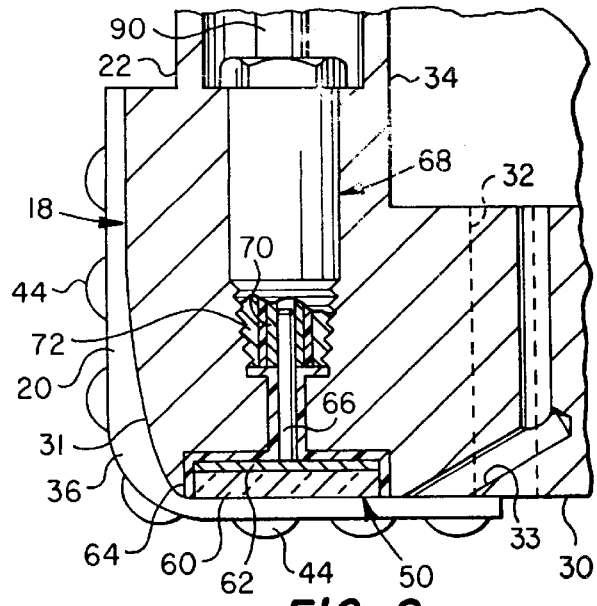
FIG. 2 is a detail section view of a typical diamond bit having a microwave energy sensor disposed therein and taken in the plane of the axis of rotation of the bit.
Figure 3:
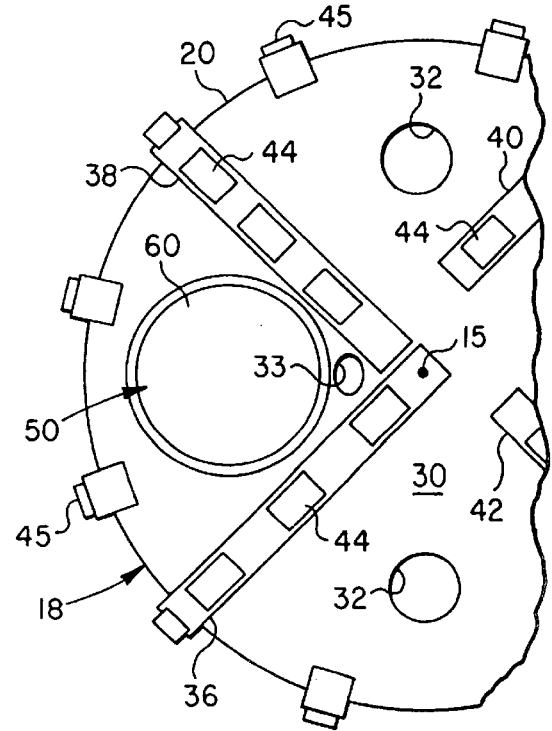
FIG. 3 is a partial plan view of the bit shown in FIG. 2.

As shown in FIGS. 2 and 3, the bit body 20 is provided with a generally transverse end face 30 portion which intersects a sloping outer sidewall 31, preferably having a parabolic shape in the plane of FIG. 2 so as to minimize the formation area ahead of the bit which would accumulate drilling fluid filtrate. Plural drilling fluid ejection ports or nozzles 32 and 33 are operable to be in communication with a passage 34 which receives drilling fluid through the drill stem 14 in a conventional manner. The bit 18 also has conventional circumferentially spaced blades 36, 38, 40 and 42, FIGS. 2 and 3, on which polycrystalline diamond blanks or inserts 44 are disposed, respectively. Conventional gage inserts 45 are also provided on the body 20. The bit 18 is exemplary and those skilled in the art will recognize that other specific bit designs of the so called diamond type, or the like, may be used in conjunction with the present invention.

Referring again briefly to FIG. 1, the bit 18 is adapted to include a sensor, generally designated by the numeral 50, disposed in the body 20 and opening toward the transverse end face 30. At least one nozzle (FIG. 3) 33 is directed to cause fresh drilling fluid to wash across the sensor 50 to maintain a predetermined thin layer of drilling fluid between the sensor and the uninvaded formation ahead of the bit 18. The sensor 50 is operable to transmit microwave frequency range electromagnetic wave energy into the formation 12 directly ahead of the bit, in particular, into the formation zone 13. The sensor 50 is in communication with a conventional source of microwave frequency range electromagnetic wave energy and which comprises not only a source but a receiver of reflected energy from the sensor 50. This source is generally designated by the numeral 52 in FIG. 1 and is suitably disposed in the sub 19. Still further, the sub 17 is adapted to include certain formation measuring tools or devices such as a formation density logging instrument 54 and a formation porosity measuring instrument 56, both disposed in the sub. The density measuring device or instrument 54 may be of a type known as a gamma-gamma density sensor comprising multiple sets of detector banks, not shown, which are comprised of rugged Geiger-Mueller (GM) tubes placed around the circumference of a sensor insert, also not shown, in a common plane perpendicular to the axis of the instrument. These detectors are of the same axial distance from a gamma radiation source. This type of instrument is commercially available under the service mark SFD from NL Industries, Inc., Houston, Tex. Still further, the porosity sensing instrument 56 may be of a type commercially available and known as a neutron type sensor or compensated neutron sensor such as developed as a commercial service by Schlumberger, Houston, Tex. Measurements carried out by the instruments 54 and 56 may be compared to determine the actual porosity and or lithology of the formation material being penetrated by the wellbore 10.

Referring again to FIG. 2, the sensor 50 may be characterized as a microwave frequency range antenna for emitting electromagnetic radiation in a frequency range of about 0.10 GHz to 3.0 GHz. The sensor 50, as illustrated, is characterized by a ceramic disc 60 having a conductive metallic backing 62 which is isolated from the bit body 20 by a suitable dielectric material 64. A conductor pin 66 extends from the metallic backing 62 into a connector 68. The connector 68 has a coaxial sleeve conductor 70 formed thereon which is insulated from a body member 72 which is in conductive engagement with the bit body 20.

Figure 4:
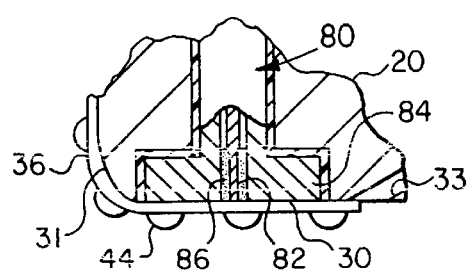
FIG. 4 is a detail view in the same plane as that of FIG. 2 of an alternate embodiment of a sensor mounted in a diamond type bit in accordance with the invention.

FIG. 4 shows an alternate embodiment of a sensor in accordance with the invention and generally designated by the numeral 80. The sensor 80 is adapted to be mounted in the bit body 20, with some modification thereto, in place of the sensor 50 and is comprised of a center conductor 82 which is isolated from an outer conductor 84 by a suitable dielectric sleeve portion 86. The sensor 80 may be characterized as a microwave energy wave guide for emitting microwave energy into the formation zone 13, which is essentially contiguous with the bit end face 30. In like manner the sensor 50 may function as a microwave energy antenna which also emits microwave energy into the formation zone 13. Both sensors 50 and 80 are suitably connected to cable means 90, FIG. 1, connected to the instrument 52.

The instrument 52 may be characterized as a so called network analyzer which is adapted to generate microwave frequency range electromagnetic wave energy for transmission through the antenna or sensor 50 or the wave guide sensor 80 via the aforementioned cable 90. This microwave energy is emitted into the formation zone 13 and reflected back to the sensors 50 or 80 with an altered amplitude and phase angle, for example. The so called reflection co-efficient, which is a function of the complex impedance of the formation material in the zone 13 may be related to the dielectric properties of the material which, in turn, can be related to the water content of the material. Calibration of the sensors 50 and 80 may be required to compensate for a thin layer of wellbore fluid between the bit face 30 and the formation zone 13. This thin layer of fluid will typically exist during operation of the bit since the blades 36 and the inserts 44 axially project from the face 30. A very small amount of wellbore fluid may be considered to invade the formation zone 13 although not to the extent which will render inaccurate the measurements made by the instrument 52.

The reflected microwave energy signal sensed by the sensors 50 and 80 may be stored in a suitable storage medium and analyzed later or the sub 19 may include an onboard digital computer, not shown, operably connected to the network analyzer 52 for producing real time values of the dielectric constant of the material of the formation. zone 13. The instrument 52 may be a device commercially available such as a network analyzer of the 8700 Series manufactured by Hewlett Packard Company of Rockville, Md.

The measurement of dielectric properties of the material in the formation zone 13 may be correlated with porosity measurements obtained by the instruments 54, 56 since the dielectric property measurements will indicate the water content of the formation zone 13. Measurement of density and porosity obtained by the instruments 54, 56, will, of course, not be obtained until these instruments pass through the zone 13 with continued drilling by the drill stem 14 and bit 18. In any event upon retrieval of the drill stem 14 the information accumulated by the instruments 52, 54 and 56 may be analyzed to determine if the pore volume of the earth formation zone 13 is entirely occupied by water or, absent that indication, it may be assumed that quantities of hydrocarbon fluids may be present in the pore spaces of the formation material.

Thanks to the provision of the sensors 50 or 80 in the bit 18 and disposed in proximity to the bit face 30 and the previously undisturbed formation of the zone 13 material, a more accurate measurement of the formation material properties, such as water content, may be obtained since this material is not substantially invaded by wellbore fluids before measurements can be taken. Furthermore, as mentioned hereinabove, microwave energy alteration measurements are particularly useful for evaluating relatively thin layers of formation material because of their relatively high spatial resolution capability. Providing the sensors 50 or 80 in the bit face 30 thus offers the ability to detect the presence of hydrocarbon fluids in relatively thin layers of subterranean earth formations. Moreover, thanks to the configuration of the bit body 20 having a transverse end face portion 30 and a parabolic sloping sidewall 31, drilling fluid filtrate invasion into the earth formation directly ahead of the bit end face is reduced. Still further, the provision of a drilling fluid ejection nozzle, such as the nozzle 33 arranged to provide a constant, uniform flow of drilling fluid across the face of the sensors 50 or 80, provides a consistent, thin layer of drilling fluid which may be taken into account when observing the readings of energy reflected back to the sensor or emitted from the sensor, which is consistent and does not interfere with an accurate determination of the formation properties ahead of the bit. Certain other features of the bit 18, as well as the type of drilling fluid used when making measurements in accordance with the present invention, may be provided in accordance with the teaching of J. J. Rathmell, et al in the publication entitled "Development of a Method for Partially Uninvaded Coring in High Permeability Sandstone", SPE 20413, September, 1990, Society of Petroleum Engineers, Richardson, Tex. Although microwave frequency range energy is advantageous for the reasons mentioned hereinabove those skilled in the art will recognize that the sensors 50 and 80 may be modified to emit high frequency or so called ultrasonic acoustic vibrations and determine the reflected signals from these vibrations to measure formation porosity, for example.

The operation of the drill stem 14, including the arrangement illustrated in FIG. 1, is believed to be understandable from the foregoing description. During drilling the drill stem 14 and bit 18 are rotated about central axis 15, FIG. 1, and continuous measurements of the dielectric properties of the formation zone 13 may be carried out if the instrument 52 is operable with the sensors 50 or 80 to emit microwave frequency range electromagnetic radiation and sense the energy loss or reflection so that at least one of the reflection coefficient, including the dielectric loss factor or loss tangent can be determined. The measurements carried out by the instruments 52, 54 and 56 may be suitably stored for later retrieval and analysis upon withdrawal of the drill stem 14 from the wellbore or, if space permits, on board analysis of the measurements may be obtained and transmitted through the drill stem by suitable signal transmitting means, such as stress wave telemetry or so called wireline telemetry, for example.

Although preferred embodiments of the invention have been described in some detail herein, those skilled in the art will recognize that various substitutions and modifications may be made without departing from the scope and spirit of the invention as recited in the appended claims.

What is claimed is:

1. An apparatus comprising a rotatable drill stem including a bit positioned on the lower end of said drill stem for drilling into an earth formation, said bit including a bit body having a transverse face adjacent a zone of said earth formation which is substantially uninvaded by drilling fluid the improvement characterized by:

a sensor mounted in said bit body and adjacent said transverse face in a position to be in close proximity to a zone of said formation ahead of said bit and which is substantially uninvaded by drilling fluid or the like during said drilling; and an instrument operably connected to said sensor for causing the emission and receipt of signals with respect to said zone for measuring a selected property of said zone during said drilling.

2. A method for determining the presence of hydrocarbons in a relatively thin layer of an earth formation comprising the steps of:

drilling into said earth formation using a rotatable drill stem having a bit positioned on its lower end and in contact with said earth formation, said bit including a bit body having a transverse face adjacent a zone of said earth formation which is substantially uninvaded by drilling fluid and including a sensor mounted thereon and adjacent to said transverse face of said bit to emit electromagnetic wave energy into said substantially uninvaded zone of said earth formation ahead of said bit during the drilling thereof;

generating electromagnetic wave energy for emission from said sensor into said uninvaded zone during said drilling;

receiving reflected electromagnetic wave energy from said uninvaded zone at said sensor during said drilling;

measuring the alteration of at least one characteristic of said electromagnetic wave energy emitted by said sensor and received at said sensor and caused by said uninvaded zone; and comparing said measurement of said electromagnetic wave energy with said measurement of one of density and porosity measurements to detect the presence of hydrocarbons in said uninvaded zone.

3. The method set forth in claim 2 wherein:

said instrument and said sensor are operable to measure a dielectric property of said uninvaded zone.

4. The method set forth in claim 2 including the step of:

generating electromagnetic wave energy in the range of 0.10 GHz to 3.0 GHz for emission into said uninvaded zone.

5. The method set forth in claim 2 wherein:

the step of measuring the alteration of said electromagnetic wave energy includes determining a dielectric property of said substantially uninvaded zone based on said alteration of said electromagnetic wave energy.

6. The improvement of claim 1 wherein a drilling fluid is passed through said rotatable drill stem and discharged through said bit during said drilling.

* * * * *